US010048698B2

(12) United States Patent
Nordbruch et al.

(10) Patent No.: US 10,048,698 B2
(45) Date of Patent: Aug. 14, 2018

(54) GUIDING OF A MOTOR VEHICLE IN A PARKING LOT

(71) Applicant: Robert Bosch GmbH, Stuttgart (DE)

(72) Inventors: Stefan Nordbruch, Kornwestheim (DE); Stefan Hoffmann, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/556,513

(22) PCT Filed: Jan. 28, 2016

(86) PCT No.: PCT/EP2016/051757
§ 371 (c)(1),
(2) Date: Sep. 7, 2017

(87) PCT Pub. No.: WO2016/142099
PCT Pub. Date: Sep. 15, 2016

(65) Prior Publication Data
US 2018/0046198 A1 Feb. 15, 2018

(30) Foreign Application Priority Data
Mar. 11, 2015 (DE) .................. 10 2015 204 359

(51) Int. Cl.
*G05D 1/02* (2006.01)
*B60W 30/06* (2006.01)
*G08G 1/16* (2006.01)

(52) U.S. Cl.
CPC ........... *G05D 1/0276* (2013.01); *B60W 30/06* (2013.01); *G05D 1/0212* (2013.01);
(Continued)

(58) Field of Classification Search
CPC ........ G05D 1/02; B60W 30/06; B60W 40/02; B60W 10/20; G08G 1/14; G08G 1/0968; G08G 1/168
(Continued)

(56) References Cited

U.S. PATENT DOCUMENTS 7,538,690 B1 * 5/2009 Kaplan ................... G01C 21/20
340/932.2
7,893,848 B2 * 2/2011 Chew ....................... G08G 1/14
340/932.2
(Continued)

FOREIGN PATENT DOCUMENTS

DE    102009046912 A1    5/2011
DE    102010049585 A1    4/2012
(Continued)

OTHER PUBLICATIONS

International Search Report for PCT/EP2016/051757, dated May 10, 2016.

*Primary Examiner* — Tan Q Nguyen
(74) *Attorney, Agent, or Firm* — Norton Rose Fulbright US LLP; Gerard Messina (57) ABSTRACT

A method for guiding a motor vehicle in a parking facility encompasses steps of ascertaining, externally to the motor vehicle, a trajectory in the parking facility from a starting position to a destination position; transmitting at least a segment of the trajectory to the motor vehicle via a communication network; and monitoring the motor vehicle, by way of a monitoring system external to the motor vehicle, as the segment is traversed, to determine a deviation, the trajectory being ascertained as a function of a property of the motor vehicle. Also described are a corresponding apparatus, a parking system, and a computer program.

11 Claims, 7 Drawing Sheets

(52) U.S. Cl.
CPC ........... *G05D 1/0282* (2013.01); *G08G 1/168* (2013.01); *G05D 2201/0213* (2013.01); *H05K 999/99* (2013.01)

(58) Field of Classification Search
USPC ........................................................ 701/2, 96
See application file for complete search history.

(56) References Cited

U.S. PATENT DOCUMENTS

| | | | |
|---|---|---|---|
| 9,171,469 B2* | 10/2015 | Gupta | G08G 1/146 |
| 9,418,553 B2* | 8/2016 | Nakhjavani | G08G 1/144 |
| 9,508,260 B2* | 11/2016 | Shaik | G08G 1/14 |
| 2012/0056758 A1* | 3/2012 | Kuhlman | G08G 1/14 |
| | | | 340/932.2 |
| 2014/0046506 A1* | 2/2014 | Reichel | B62D 15/0285 |
| | | | 701/2 |
| 2015/0353080 A1* | 12/2015 | Mukaiyama | E05B 77/54 |
| | | | 701/23 |
| 2016/0264132 A1* | 9/2016 | Paul | B60W 30/06 |

FOREIGN PATENT DOCUMENTS

| | | |
|---|---|---|
| DE | 102012222562 A1 | 6/2014 |
| WO | 2014090463 A1 | 6/2014 |

\* cited by examiner

GUIDING OF A MOTOR VEHICLE IN A PARKING LOT

FIELD OF THE INVENTION

The present invention relates to a technique for automated guidance of a motor vehicle in a parking facility. The invention relates in particular to the determination of movement data for the motor vehicle.

BACKGROUND INFORMATION

In fully automated (autonomous) so-called "valet parking," a motor vehicle is parked by its driver at a dropoff location, for example in front of a parking structure, and from there the motor vehicle drives automatically into a parking position/parking space, or from there back to the dropoff location.

With current motor vehicles, however, or those shortly to be introduced on the market, automated valet parking (AVP) of this kind as a rule can be carried out only with considerable outlay, or not at all, since the motor vehicle requires for that purpose a plurality of additional systems (control devices, sensors, control methods) and data that usually are not available in those motor vehicles.

SUMMARY OF THE INVENTION

A method for guiding a motor vehicle in a parking facility encompasses steps of ascertaining, externally to the motor vehicle, a route in the parking facility from a starting position to a destination position, at least a segment of the route being transmitted to the motor vehicle via a communication network, the motor vehicle being monitored by an off-board monitoring system, as the segment is traversed, to determine a deviation as the segment is autonomously traversed.

An apparatus for guiding a motor vehicle in a parking facility encompasses a processor that is embodied to ascertain a route in the parking facility from a starting position to a destination position; a communication interface that is embodied to transmit at least a segment of the route to the motor vehicle via a communication network; and a monitoring system that is embodied to monitor the motor vehicle, as the segment is autonomously traversed, to determine a deviation as the segment is traversed.

A parking system for motor vehicles encompasses a parking facility that has one or more parking positions, the parking system encompassing the aforementioned apparatus for guiding a motor vehicle in a parking facility.

A "parking facility" for purposes of the present invention can also be referred to as a "parking area," and serves as an area for parking motor vehicles. The parking facility thus constitutes in particular a continuous area that encompasses several parking locations (in the context of a parking facility on private land) or parking spaces (in the context of a parking facility on public land). According to an embodiment, the parking facility can be encompassed by a parking structure. In particular, the parking facility is encompassed by a garage.

"Autonomously" means for purposes of the present invention, in particular, that the vehicle navigates or drives independently, i.e. without intervention of a driver. The vehicle thus drives independently in the parking facility with no need for a driver to control the vehicle, or to be present in the vehicle, for that purpose. An autonomously driving vehicle of this kind which can automatically enter and exit a parking space is referred to, for example, as an "automatic valet parking" vehicle or "AVP" vehicle. Motor vehicles that do not exhibit this AVP functionality are referred to, for example, as "ordinary" vehicles.

A "dropoff position" for purposes of the present invention is a position at which a driver of the motor vehicle can park his or her motor vehicle for an autonomous parking operation, and from which he or she can pick up his or her vehicle again at a later point in time.

A "parking position" for purposes of the present invention is a position at which the motor vehicle is intended to park autonomously.

The motor vehicle can navigate or drive autonomously from the dropoff position to the parking position. The motor vehicle can autonomously enter the parking position. The motor vehicle can autonomously exit the parking position. The motor vehicle can autonomously navigate or drive from the parking position to the dropoff position.

Upon a deviation, a compensation route for compensating for the deviation can be ascertained, the compensation route being transmitted via the communication network to the motor vehicle so that the motor vehicle can compensate for the deviation by traversing the compensation route.

Upon a deviation, a stop signal can be transmitted via the communication network to the motor vehicle so that the motor vehicle can stop in response to reception of the stop signal.

Segments of the route can be transmitted successively via the communication network to the motor vehicle so that the motor vehicle can traverse the route in segments. This therefore means in particular that the motor vehicle can traverse the route in segments. "Successively" can mean here in particular that it is only after the motor vehicle has traversed the segment that a further segment, which directly follows the segment just traversed, is made available to it. "Made available" means here in particular that the segments are transmitted via the communication network to the motor vehicle. According to an embodiment, the respective segments all have the same length.

The respective length of the segments can be dependent on a degree of difficulty relating to traversing of the segment. For example, a straight segment can be longer than a curved segment. The length of a segment is therefore dependent on the current driving route segment or driving route complexity.

The respective length of the segments can be dependent on a degree of capability of the motor vehicle relating to the task of autonomous driving. The degree of capability is based in particular on capabilities or functions of the controller, of the sensors, and of the actuators. This therefore means that the respective length is selected as a function of the motor vehicle's capabilities in terms of the extent to which, or how well, it can drive autonomously.

According to another embodiment, the respective length of the segments is dependent on a traffic density or object density. This means that if many motor vehicles are present around the motor vehicle, the segments are then shorter than if fewer motor vehicles are present around the motor vehicle. This means that the length of a segment is selected as a function of the environment.

A parking entry route for entering a parking space and/or a parking exit route respectively for entering and exiting a parking space can be ascertained externally to the motor vehicle and transmitted via the communication network to the motor vehicle, so that the motor vehicle can autonomously enter and exit the parking position.

The motor vehicle can enter or exit a parking space independently, i.e. autonomously or fully automatically. Parking entry or exit is carried out by the motor vehicle itself; in particular, it itself ascertains the parking entry route or parking exit route.

A return travel route back from the destination position to the starting position can additionally be ascertained externally to the motor vehicle, at least a segment of the return travel route being transmitted via the communication network to the motor vehicle, the motor vehicle being monitored by the off-board monitoring system, as the segment of the return travel route is autonomously traversed, to determine a deviation as the segment is traversed. The statements made in connection with the route from the starting position to the destination position also apply analogously to the return travel route.

The starting position can be a dropoff position at which a driver can park his or her vehicle for an automatic parking operation, and the destination position can be a parking position at which the motor vehicle can automatically park, or vice versa.

The object on which the invention is based is that of ascertaining in improved fashion a route or trajectory between the starting position and the destination position. This object is achieved by the subject matter of the descriptions herein. Further embodiments are described in the further descriptions herein.

A method for guiding a motor vehicle in a parking facility encompasses steps of ascertaining, externally to the motor vehicle, a trajectory in the parking facility from a starting position to a destination position; transmitting at least a segment of the trajectory to the motor vehicle via a communication network; and monitoring the motor vehicle by an off-board monitoring system to determine a deviation as the segment is autonomously traversed, the trajectory being ascertained as a function of a property of the motor vehicle.

By ascertaining the trajectory as a function of the property of the motor vehicle it is possible to ensure that the motor vehicle is capable of traveling along the trajectory. A risk that the motor vehicle might get stuck on the trajectory, or not be able to reach the destination position, can thereby be reduced.

The property can encompass a vehicle type. The vehicle type can be assigned, for example, by a manufacturer of the motor vehicle. Approximate vehicle dimensions, for example, can be gathered from the vehicle type.

The property can also encompass an equipment inventory. External dimensions of the motor vehicle can thereby be better determined, in particular in combination with the vehicle type. A special version that influences the vehicle outline, for example wider outside mirrors or a trailer hitch, can furthermore be taken into consideration.

It furthermore may be that the trajectory be associated with a path between the starting position and the destination position. Different destination positions can thereby be arrived at by the motor vehicle on respectively predetermined trajectories.

Depending on the degrees of freedom that are supported, an n-dimensional matrix of trajectories can be kept on hand so that, for example, a trajectory can be associated with a combination of vehicle type, starting position, and destination position. The trajectory ascertained for the motor vehicle can thereby be better adapted to the specifics of the path between the starting position and the destination position, and of the motor vehicle.

The individual trajectories can be determined in different ways. In particular, a trajectory can be ascertained by way of an experiment. A motor vehicle of the same, or of a comparable, type can be used, for example, for the experiment.

In another embodiment, the trajectory is determined on the basis of geometrical or functional data of the parking facility and of the motor vehicle. The geometrical data of the motor vehicle can relate, for example, to its outline, to a wheelbase, to a minimum turning circle, to a maximum steering angle, or to other characteristics. The functional data can encompass, for example, the setting of a controller.

These procedures can also be combined with one another. In particular, some trajectories can be determined by experiment and others on the basis of geometrical data.

It may be provided that a plurality of trajectories be determined and saved before an appropriate trajectory for the motor vehicle is ascertained. The determining of the individual trajectories can thereby be decoupled from the guiding of the motor vehicle in the parking facility.

In a variant, the trajectory ends in front of a parking position, an entry operation of the motor vehicle into the parking position being controlled autonomously by the motor vehicle. A parking assistant present in the motor vehicle can advantageously be utilized in this context.

In another variant the trajectory encompasses the parking position, so that the destination position can coincide with the parking position. A motor vehicle not having a parking assistant can thus also be guided reliably to the parking position.

It furthermore may be provided that a determination be made of the destination positions in the parking facility for which a trajectory for the motor vehicle can be ascertained. Different destination positions can require variously challenging trajectories. If a vehicle cannot fit through a narrow point on a trajectory or cannot follow a turning radius of the trajectory, for example because of its geometrical property, a trajectory then cannot be provided for that vehicle type. The parking position located in the region of the destination position of the trajectory then cannot be reached by the motor vehicle. The procedure can be similar if the dimensions of the parking position are too small for the motor vehicle. If a trajectory cannot be ascertained for the motor vehicle for a destination position, a different destination position that can be reached by the motor vehicle can then be determined.

A computer program product encompasses a program code arrangement having program code for carrying out the above-described method when the computer program product executes on a processing device or is stored on a computer-readable data medium.

An apparatus for guiding a motor vehicle in a parking facility encompasses a processor that is embodied to ascertain a trajectory in the parking facility from a starting position to a destination position; a communication interface that is embodied to transmit at least a segment of the trajectory to the motor vehicle via a communication network; a monitoring system that is embodied to monitor the motor vehicle, as the segment is autonomously traversed, to determine a deviation as the segment is traversed; and an ascertaining device that is embodied to ascertain the trajectory as a function of a property of the motor vehicle.

Also provided is a parking system for motor vehicles which encompasses a parking facility having one or more parking positions and the above-described apparatus.

The invention will be explained in further detail below with reference to THE exemplifying embodiments.

DETAILED DESCRIPTION

Figure 1:
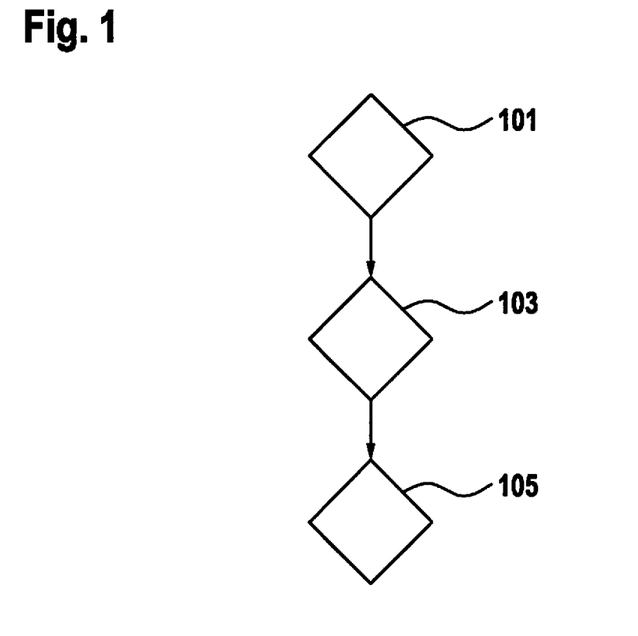
FIG. 1 is a flow chart of a method for guiding a motor vehicle in a parking facility.

FIG. 1 is a flow chart of a method for guiding a motor vehicle in a parking facility.

According to a step 101, a route or trajectory in the parking facility from a starting position to a destination position is ascertained externally to the motor vehicle. Ascertainment occurs as a function of a property of the motor vehicle. In a step 103, at least a segment of the route is transmitted to the motor vehicle via a communication network. According to a step 105 the motor vehicle is monitored by an off-board monitoring system, as the segment is traversed, to determine a deviation as the segment is autonomously traversed. The motor vehicle is thus guided externally to the motor vehicle, i.e. is remotely controlled.

Figure 2:
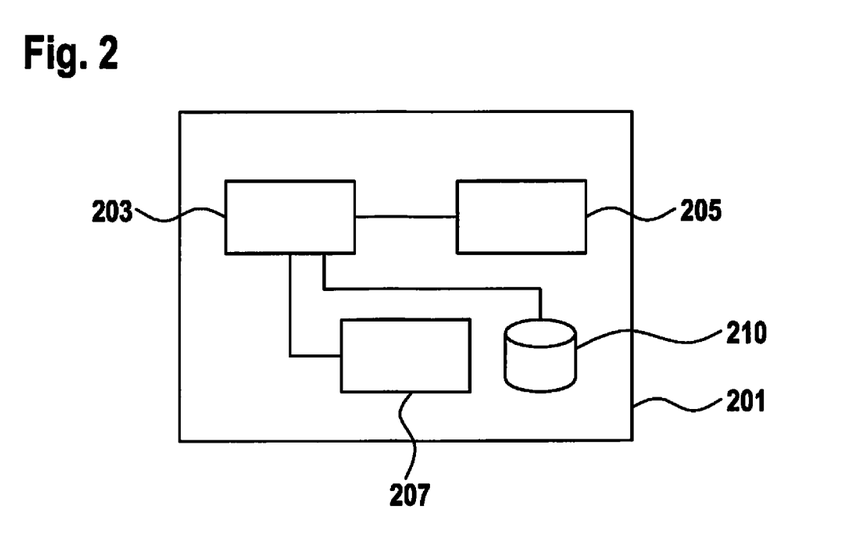
FIG. 2 shows an apparatus for guiding a motor vehicle in a parking facility.

FIG. 2 shows an apparatus 201 for guiding a motor vehicle in a parking facility. Apparatus 201 encompasses a processor 203 that is embodied to ascertain a route or trajectory in the parking facility from a starting position to a destination position. Apparatus 201 furthermore encompasses a communication interface 205 that is embodied to transmit at least a segment of the route to the motor vehicle via a communication network. Apparatus 201 furthermore encompasses a monitoring system 207 that is embodied to monitor the motor vehicle, as the segment is autonomously traversed, to determine a deviation as the segment is driven. A device 210 for ascertaining a trajectory is also provided. Device 210 can encompass in particular a memory device.

According to an embodiment, apparatus 201 is embodied to execute or carry out a method, in particular the method in accordance with FIG. 1.

The apparatus is an apparatus external to the motor vehicle, i.e. is not itself present or disposed in the motor vehicle. Remote control of the motor vehicle, externally to the motor vehicle, is thus made possible. The motor vehicle is told in this context how it has to drive in the parking facility. The motor vehicle therefore simply needs to traverse the predefined segment in order to be able to drive autonomously in the parking facility. It does not need to have any knowledge of the parking facility for its autonomous journey. In particular, the motor vehicle does not need, for its autonomous journey in the parking facility, to carry out any localization of itself in the parking facility. The reason is that such localization as a rule is possible only with difficulty, since a line-of-sight connection to satellites, for example GPS satellites, usually must exist for localization. This is usually not the case in parking facilities, in particular in parking structures or parking garages.

Figure 3:
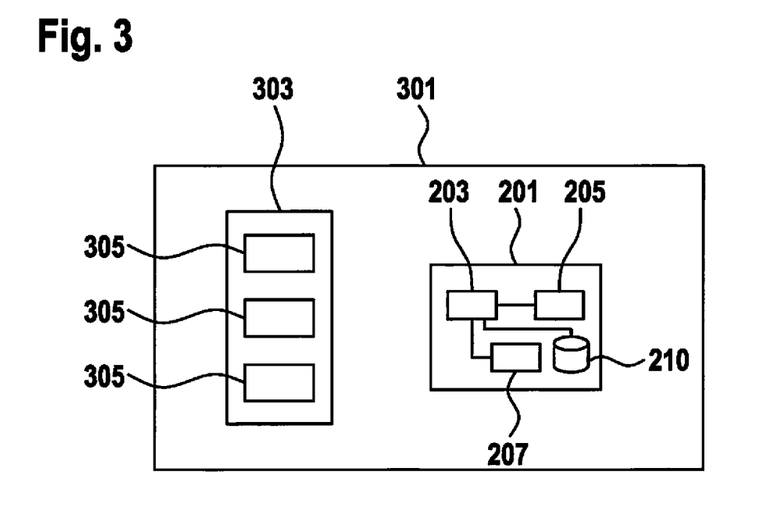
FIG. 3 shows a parking system for motor vehicles.

FIG. 3 shows a parking system 301 for motor vehicles. Parking system 301 encompasses a parking facility 303. Parking facility 303 encompasses one or more parking positions 305. Parking system 301 furthermore encompasses apparatus 201 of FIG. 2.

FIGS. 4A to G each show a point in time in the context of execution of an automatic parking operation ("automatic valet parking").

FIGS. 4A to 4G each show a parking facility 401, encompassing several parking positions 403 that correspond to parking spaces or parking locations. Motor vehicles can therefore park at these parking positions 403. Parked vehicles 405 are, for example, AVP motor vehicles. An AVP motor vehicle 409 has been dropped off at a dropoff position 407, and is now intended to drive to parking position 403 assigned to it.

Figure 4A:
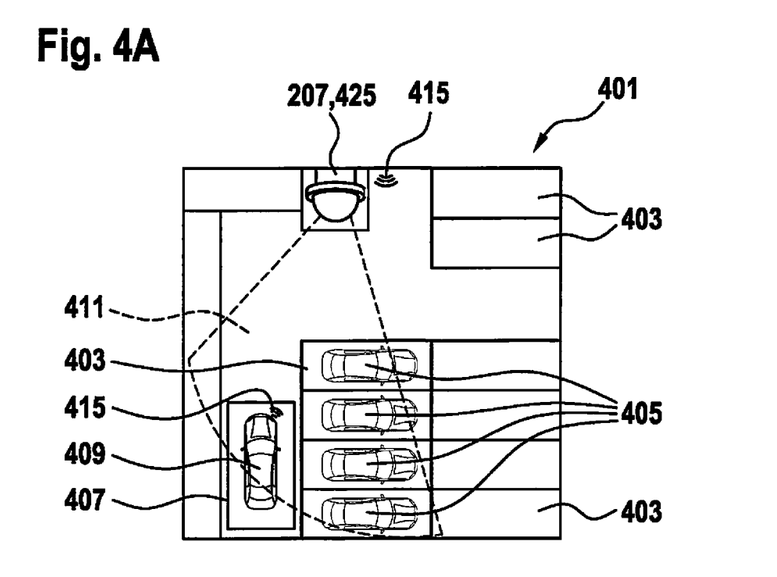
FIG. 4 shows a parking system at different points in time during execution of an automatic parking operation.

FIG. 4A shows AVP motor vehicle 409 that is parked at dropoff position 407. An apparatus 201 is provided, only monitoring system 207 thereof being shown here for better clarity. For reasons of clarity, the further elements of apparatus 201 are not shown.

According to an embodiment, monitoring system 207 encompasses one or more monitoring cameras 425, at least one of which can be embodied as a video camera. According to a further embodiment monitoring system 207 encompasses, for example, one or more radar sensors, lidar sensors, cameras, video cameras, light barriers, or a combination of several sensors. Other sensors are also possible. Apparatus 201 therefore detects, by way of monitoring system 207, the presence of AVP motor vehicle 409 at dropoff position 407.

Figure 4B:
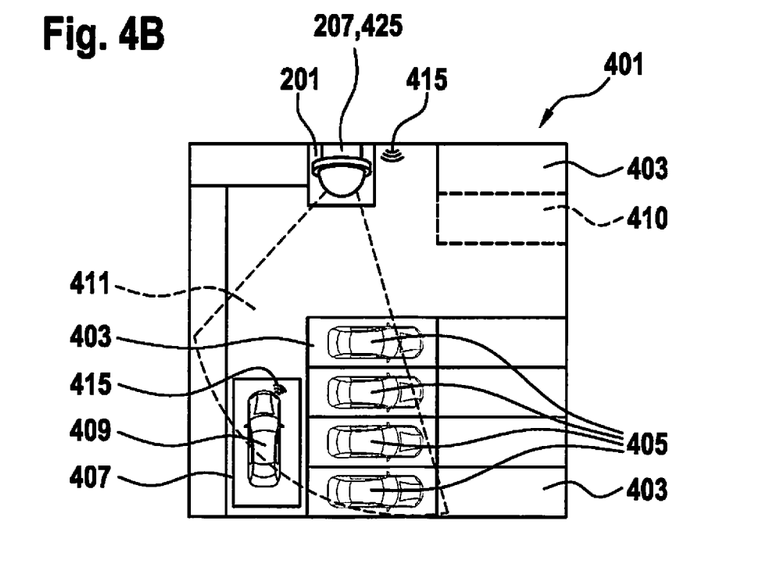

Apparatus 201 therefore subsequently ascertains an assigned position for motor vehicle 409, which position is depicted with dashed lines in FIG. 4B and is labeled with the reference character 410. An exemplifying capture angle of monitoring system 207 is depicted symbolically by a cone having the reference character 411. Communication between apparatus 201 and motor vehicle 409 is carried out in particular via a wireless communication network, in particular a WLAN. This is symbolically depicted by a corresponding pictogram to which reference character 415 points.

Figure 4C:
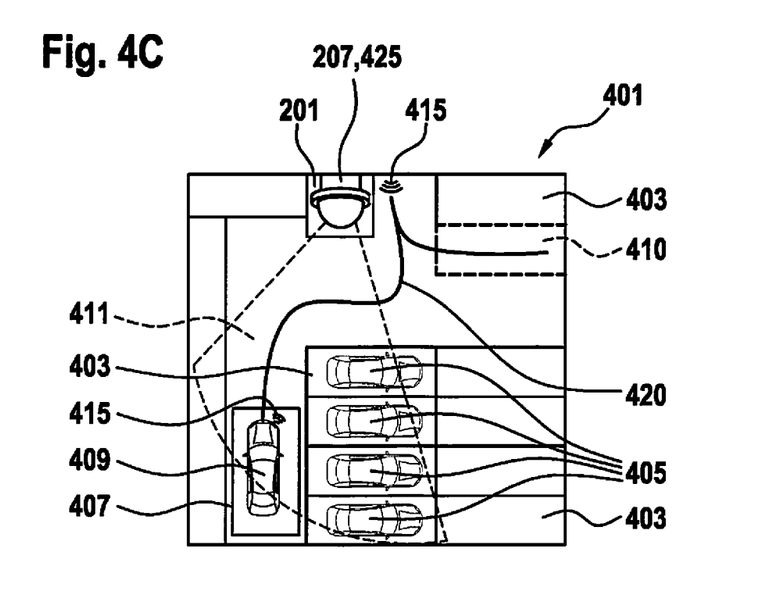

Apparatus 201 furthermore ascertains a trajectory or path or pathway or route 420 from dropoff position 407 to assigned parking position 410. It may be provided that the ascertained route 420 be divided into segments that are transmitted individually, in particular successively, to the motor vehicle.

Figure 4D:
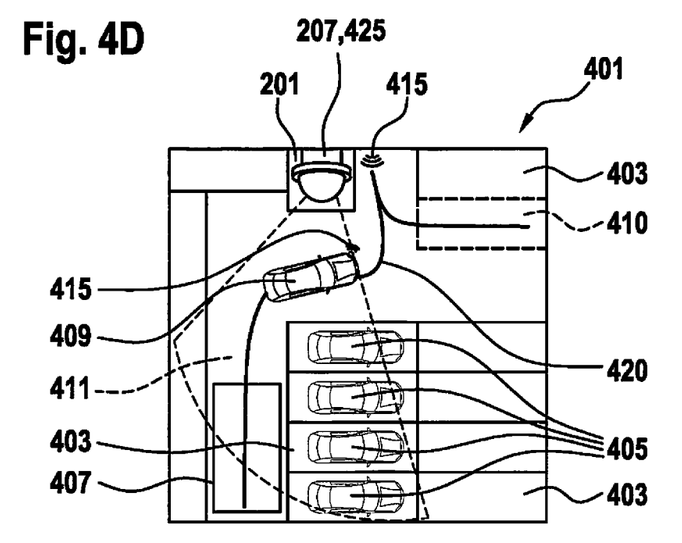
Figure 4E:
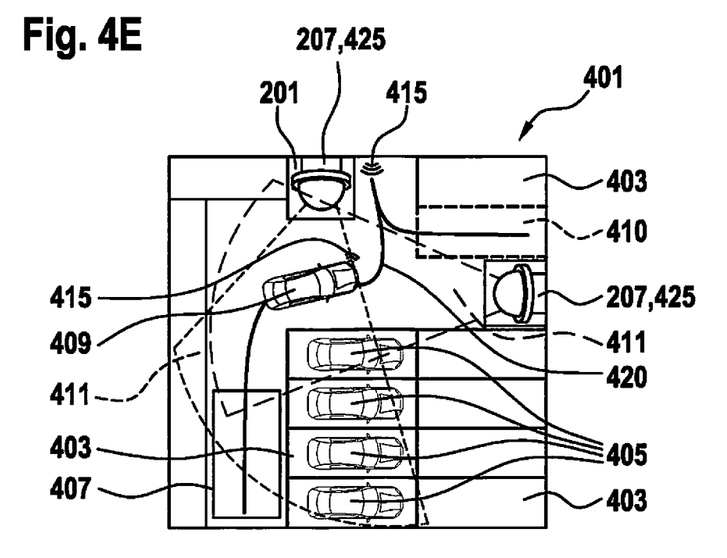

FIG. 4D shows the manner in which motor vehicle 409 now traverses the ascertained route 420 in segments. Monitoring occurs, by way of monitoring system 207, during traversing. FIG. 4E shows by way of example a further monitoring camera 425 in parking facility 401, which camera has a corresponding capture angle 411 within which motor vehicle 409 can be detected by way of monitoring camera 425. Monitoring camera 425 can encompass in particular a video camera.

Figure 4F:
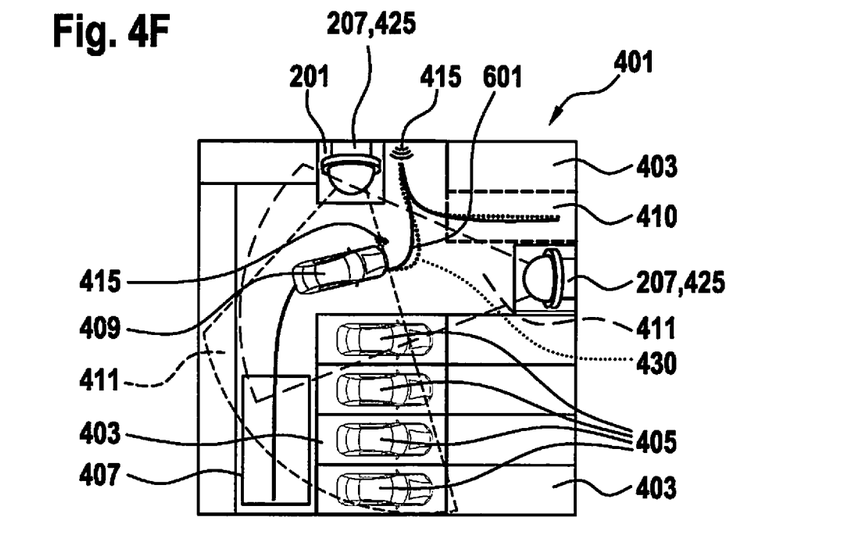

If a deviation as route 420 is traversed has been identified by way of one of monitoring systems 207, apparatus 201 can calculate or ascertain a compensation path or compensation route. This is shown in FIG. 4F, the compensation route being labeled with the reference character 430.

Figure 4G:
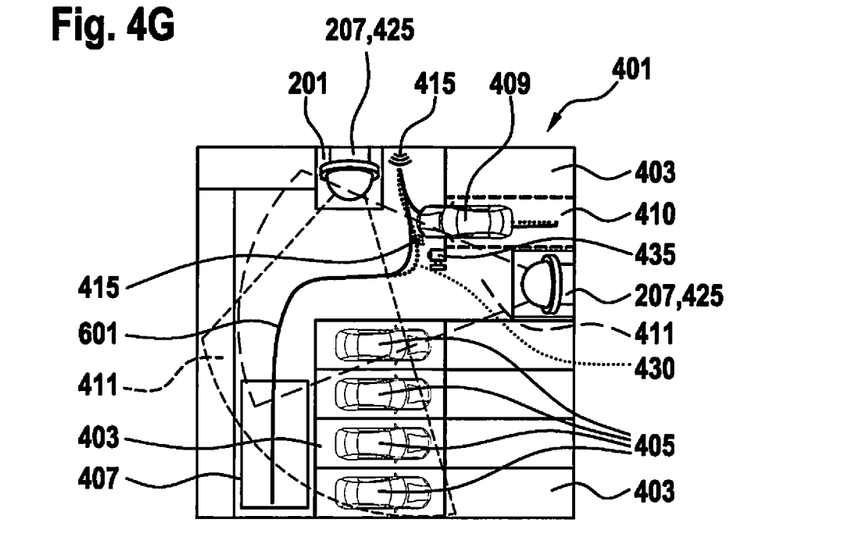

In an embodiment, a parking entry operation as shown in FIG. 4G can be carried out by a parking assistance system, i.e. by motor vehicle 409 itself. Motor vehicle 409 encompasses for this, for example, a symbolically depicted environmental sensor suite 435 encompassing, for example, one or more radar sensors and/or one or more ultrasonic sensors and/or one or more lidar sensors or video sensors. In another embodiment, apparatus 201 can alternatively take over the calculation or ascertainment of the corresponding parking entry route. The same also applies to exiting from the parking space.

The path of motor vehicle 409 back from assigned parking position 410 to dropoff position 407 can be executed analogously, so that this transport can also occur in automated fashion. Here as well, a corresponding return travel route may then be ascertained, and motor vehicle 409 is monitored as the return travel route is traversed in segments, and corresponding compensation paths 430 or compensation routes 430 are optionally determined as necessary and transferred to motor vehicle 409.

Figure 5:
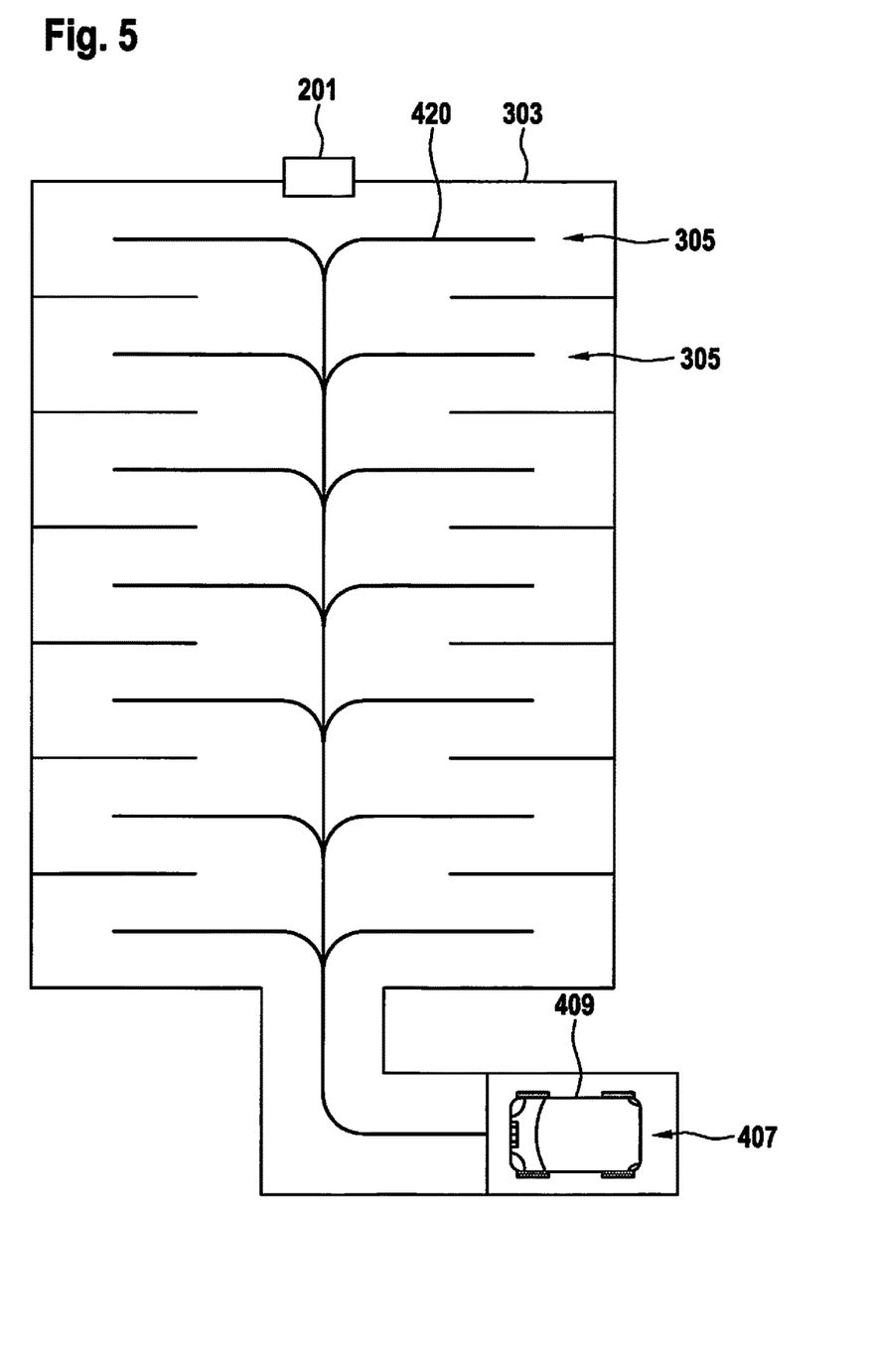
FIG. 5 is a view of an exemplifying parking facility.

FIG. 5 shows a parking system 301 for motor vehicles. Parking system 301 encompasses a parking facility 303. Parking facility 303 encompasses one or more parking positions 305. Parking system 301 further encompasses apparatus 201 of FIG. 2.

A number of trajectories 420 are provided in order to guide a motor vehicle 409 from dropoff position 407 to one of parking positions 305. Dropoff position 407 is a starting position, and parking position 305 a destination position, of trajectory 420. In the present embodiment the destination point coincides with parking position 305; in another embodiment the destination point can also be located in the region of parking position 305, so that an entry operation into parking position 305 can be carried out, without assistance by apparatus 201, by way of a parking assistant present in motor vehicle 409.

It may be provided that at least one trajectory 420 be assigned to each parking position 305. If multiple dropoff positions 407 or starting positions are supported, then at least one trajectory 420 may be associated with each combination of one dropoff position 407 or starting position, and one parking position 305 or destination position.

Different properties of motor vehicle 409 enable or require different routings of a trajectory 420 between dropoff position 407 and parking position 305. For example, a narrow motor vehicle can pass more easily than a wide motor vehicle through a narrow point in parking facility 303. A motor vehicle having a short wheel base can possibly negotiate a tighter curve than a motor vehicle having a long wheelbase. It therefore may be provided that the trajectory 420 ascertained for motor vehicle 409 be one that is associated with the property of motor vehicle 409. The property can encompass, for example, static dimensions such as a length, a width, or a height. The property can also encompass dynamic aspects such as a minimum curve radius or a steering rate. In an embodiment, parameters of motor vehicle 409 are stored in a table, the key to which is a vehicle type. For example, a determination can be made that a motor vehicle 409 of manufacturer A has a predetermined length D. In a further embodiment, a key or sub-key for a version of motor vehicle 409 can also be provided. a special equipment inventory, for example, can thereby be taken into account.

Before motor vehicle 409 is guided from dropoff position 407 to a parking position 305, a determination can be made as to whether a trajectory 420 exists which is suitable for the present motor vehicle 409. If that is not the case, a different parking position 305 can be selected for motor vehicle 409 and a corresponding trajectory 420 can be ascertained for it. The above-described guidance of motor vehicle 409 along trajectory 420 can then occur.

Figure 6:
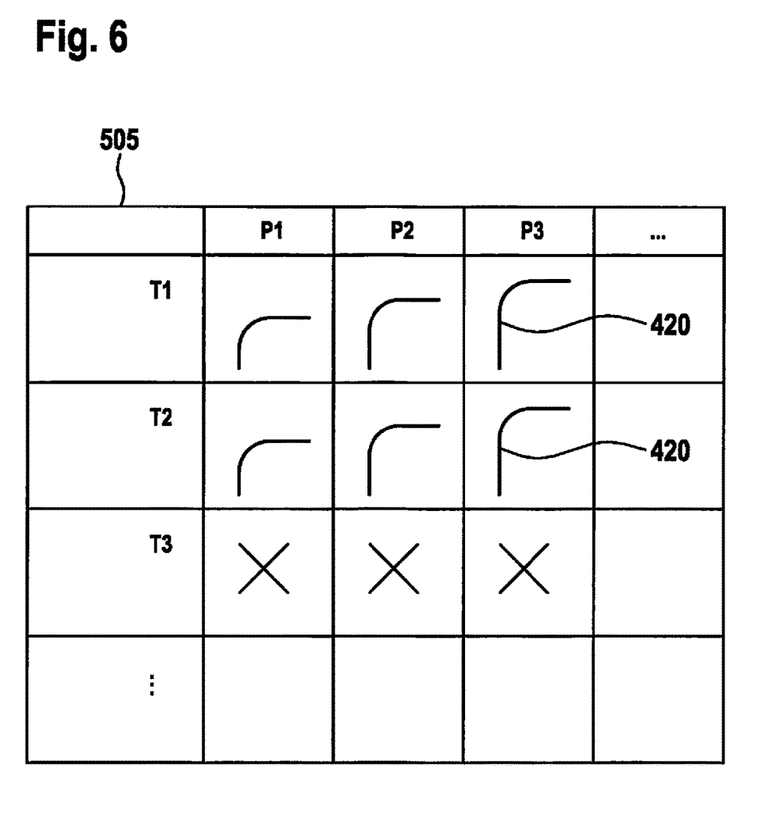
FIG. 6 graphically depicts trajectories in a matrix.

FIG. 6 is a graphic depiction of several trajectories 420 in the manner of a table. Trajectories 420 that are depicted may already available to parking system 301 even before a motor vehicle 409 is to be guided to a parking position. It may be provided that a plurality of trajectories 420 be determined and saved before one of them is ascertained for motor vehicle 409. Trajectories 420 can be stored in particular in a memory inside device 210 for ascertaining a trajectory 420. The selection of a trajectory 420 can be dependent on one or more criteria, so that a list, a two-dimensional or multi-dimensional table, or a matrix can be used as a memory structure. In the present exemplifying embodiment a two-dimensional matrix 505 is provided, encompassing dimensions of a type (T1, T2, T3, . . . ) of motor vehicle 409 and a path (P1, P2, P3, . . . ) between dropoff position 407 and various parking positions 403. Further dimensions can be added as necessary, for example with reference to a version or equipment inventory of motor vehicle 409.

A trajectory 420 is associated with a combination of values in the supported dimensions of matrix 505. Different trajectories 420 for the route between dropoff position 407 and the same parking position 305, can be associated, for example, with different vehicle types. The different trajectories 420 can result in particular from geometrical circumstances or properties of motor vehicle 409. Different trajectories 420 between dropoff position 407 and different parking positions 305 can correspondingly be associated with a vehicle type. It is of course possible for the same trajectory 420 to be used at several points in matrix 505, for example for different motor vehicle types on identical paths.

In a further embodiment, different trajectories 420 are furnished for each motor vehicle 409 (version/equipment variant). For example, one trajectory 420 can apply to a parking facility 303, 401 in which (at times) no people and/or other manually controlled motor vehicles 405 are traveling. In this case motor vehicle 409 could also use an opposite-direction lane in order to simplify control. Further possibilities would be that different routes to a parking position 403 exist in parking facility 303, 401. Further trajectories 420 can be determined using the assumption of different speeds of motor vehicle 409.

It can also be the case that a combination of values of the supported dimensions does not have a trajectory 420 associated with it in matrix 505. For example, a motor vehicle 409 of type T3 cannot be conveyed to any of parking positions 305 that are associated with columns P1, P2, or P3. This instance can exist, for example, when motor vehicle 409 of type T3 is too large for parking positions 305.

As a result of the tabular or matrix-like furnishing of, if possible, all the trajectories 420 that can be necessary for automated guidance of a motor vehicle 409, an appropriate trajectory 420 for a given motor vehicle 409 and a given parking position 305 can be determined easily and quickly. The ordinary operation of parking facility 401 may require no further determination of trajectories 420.

What is claimed is:

1. A method for guiding a motor vehicle in a parking facility, the method comprising:
   ascertaining, externally to the motor vehicle, a trajectory in the parking facility from a starting position to a destination position; and
   transmitting at least a segment of the trajectory to the motor vehicle via a communication network;
   wherein the motor vehicle is monitored by an off-board monitoring system, as the segment is traversed, to determine a deviation as the segment is autonomously traversed,
   wherein the trajectory is ascertained as a function of a property of the motor vehicle,
   wherein the property includes vehicle parameters, the vehicle parameters including static dimensions of the motor vehicle, including at least one of a length, a width, and a height of the vehicle, the vehicle parameters further including vehicle dynamic parameters, including at least one of a minimum curve radius and a steering rate, and
   wherein the vehicle parameters of the motor vehicle are stored in a table, a key to which is a vehicle type of the motor vehicle.

2. The method of claim 1, wherein the property includes an equipment inventory.

3. The method of claim 1, wherein the trajectory is associated with a path between the starting position and the destination position.

4. The method of claim 1, wherein the trajectory is ascertained by experiment.

5. The method of claim 1, wherein the trajectory is determined based on geometrical or functional data of the parking facility and of the motor vehicle.

6. The method of claim 1, wherein the trajectory ends in front of a parking position, and an entry operation of the motor vehicle into the parking position is controlled autonomously by the motor vehicle.

7. The method of claim 1, wherein the trajectory includes a parking position.

8. The method of claim 1, wherein a determination is made of the destination positions in the parking facility for which a trajectory for the motor vehicle can be ascertained.

9. A computer readable medium having a computer program, which is executable by a processor, comprising:
- a program code arrangement having program code means for guiding a motor vehicle in a parking facility, by performing the following:
  - ascertaining, externally to the motor vehicle, a trajectory in the parking facility from a starting position to a destination position; and
  - transmitting at least a segment of the trajectory to the motor vehicle via a communication network;
  - wherein the motor vehicle is monitored by an off-board monitoring system, as the segment is traversed, to determine a deviation as the segment is autonomously traversed,
  - wherein the trajectory is ascertained as a function of a property of the motor vehicle,
  - wherein the property includes vehicle parameters, the vehicle parameters including static dimensions of the motor vehicle, including at least one of a length, a width, and a height of the vehicle, the vehicle parameters further including vehicle dynamic parameters, including at least one of a minimum curve radius and a steering rate, and
  - wherein the vehicle parameters of the motor vehicle are stored in a table, a key to which is a vehicle type of the motor vehicle.

10. An apparatus for guiding a motor vehicle in a parking facility, comprising:
- a processor to ascertain a trajectory in the parking facility from a starting position to a destination position; and
- a communication interface to transmit at least a segment of the trajectory to the motor vehicle via a communication network;
- a monitoring system to monitor the motor vehicle, as the segment is autonomously traversed, to determine a deviation as the segment is traversed; and
- an ascertaining device to ascertain the trajectory as a function of a property of the motor vehicle,
- wherein the property includes vehicle parameters, the vehicle parameters including static dimensions of the motor vehicle, including at least one of a length, a width, and a height of the vehicle, the vehicle parameters further including vehicle dynamic parameters, including at least one of a minimum curve radius and a steering rate, and
- wherein the vehicle parameters of the motor vehicle are stored in a table, a key to which is a vehicle type of the motor vehicle.

11. A parking system for a motor vehicle, comprising:
- a parking facility having at least one parking positions; and
- an apparatus for guiding the motor vehicle in a parking facility, including:
  - a processor to ascertain a trajectory in the parking facility from a starting position to a destination position; and
  - a communication interface to transmit at least a segment of the trajectory to the motor vehicle via a communication network;
  - a monitoring system to monitor the motor vehicle, as the segment is autonomously traversed, to determine a deviation as the segment is traversed; and
- an ascertaining device to ascertain the trajectory as a function of a property of the motor vehicle,
- wherein the property includes vehicle parameters, the vehicle parameters including static dimensions of the motor vehicle, including at least one of a length, a width, and a height of the vehicle, the vehicle parameters further including vehicle dynamic parameters, including at least one of a minimum curve radius and a steering rate, and
- wherein the vehicle parameters of the motor vehicle are stored in a table, a key to which is a vehicle type of the motor vehicle.

* * * * *